United States Patent Office 3,176,459
Patented Apr. 6, 1965

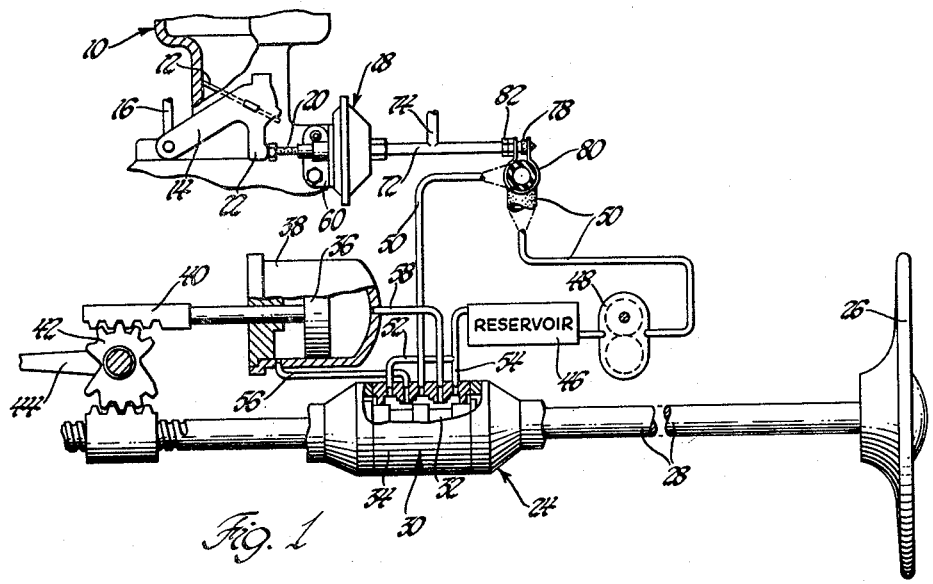

3,176,459
THROTTLE ACTUATOR
Leland C. Parker, Rochester, N.Y., assignor to General Motors Corporation, Detroit, Mich., a corporation of Delaware
Filed May 23, 1963, Ser. No. 282,748
4 Claims. (Cl. 60—19)

The present invention relates to a mechanism which will open the throttle valve of a vehicle engine slightly from its normal idling position when the vehicle power steering system is operated, thereby preventing engine stalling.

While endeavoring to turn or park a vehicle having a power steering system, it is not uncommon for the operator to have his foot removed completely from the accelerator pedal and the engine merely idling. When this occurs, the power steering system imposes a load on the idling engine which, unless compensated for, will frequently cause engine stalling. The present invention compensates for this load through a mechanism adapted to open the throttle valve in response to the operation of the power steering system. More specifically, the present invention opens the throttle valve a predetermined amount in response to the increase in power steering fluid pressure caused by operation of the power steering system.

In the present invention a diaphragm is connected to the throttle valve. The diaphragm is spring biased to open the throttle valve. Vacuum acts on the diaphragm against the spring permitting the throttle valve to close. A vent is provided in the system which, when opened, will admit atmosphere, nullifying the effect of vacuum and permitting the spring to cause the throttle valve to open. Closing the vent is a stopper supported by a clamp which surrounds an expansible conduit in the power steering system. As the conduit expands due to increased pressure of the power steering fluid, the clamp also expands, displacing the stopper and admitting atmosphere to the system. Thus, the throttle valve is opened in response to an increase in power steering fluid pressure caused by operation of the power steering system.

The details as well as other objects and advantages of the present invention will be apparent from the accompanying description and the drawing in which:

FIGURE 1 is a diagrammatic representation of the present invention combined with an engine throttle valve and a power steering system;

FIGURE 2 is an enlarged view, partially in section with parts broken away, of the throttle actuating mechanism shown in FIGURE 1 including details of the vent and the stopper closing the vent; and FIGURE 3 is a view of the vent and stopper of FIGURE 2 with the stopper displaced from the vent by expansion of the conduit.

Referring first to FIGURE 1, a carburetor is shown generally at 10 and includes a throttle valve 12 having an exteriorly disposed throttle lever 14 to which a rod 16 is connected for normal throttle valve actuation by an accelerator pedal, not shown. A servo mechanism is shown generally at 18 and includes a stud 20 adapted to engage an arm 22 on throttle lever 14.

An illustrative power steering system is indicated generally at 24 and includes a steering wheel 26 having a shaft 28 fixed for rotation therewith. Inasmuch as the power steering system shown in the drawing is intended to represent any one of the various specific systems which may be used and which is well known to the art, the illustrated system will be described only to the extent necessary to an understanding of the present invention. A steering valve mechanism is shown at 30 and includes a spool valve 32 axially movable relative to a ported casing 34 to selectively supply fluid under pressure to the different sides of a piston 36 in a steering servo mechanism 38. Piston 36 connects through a rack 40 to a segmental gear 42 and steers the vehicle wheels through the rotation of an arm 44 fixed to gear 42.

Fluid under pressure is supplied from a reservoir 46 and a pump 48 to an expansible conduit 50 which leads to ported casing 34. With the power steering system 24 neutralized or inoperative, as shown in FIGURE 1, fluid under pressure is supplied to casing 34 but is returned to reservoir 46 through conduits 52 and 54. When the power steering system 24 is operated, spool valve 32 is moved axially to block one of the ports leading to exhaust conduit 52 or 54 and at the same time to admit fluid to one of the conduits 56 or 58 to occasion a steering of the vehicle wheels.

Referring now to FIGURE 2, it will be seen that servo mechanism 18 is secured by a bracket 60 to carburetor 10 such that the head of stud 20 abuts arm 22 of throttle lever 14. A plunger 62 is internally threaded to receive and permit adjustment of threaded stud 20. Plunger 62 is slidably received by a sleeve 64. A casing 66 is fixed to sleeve 64. Hermetically clamped between the two halves of casing 66 is a flexible, pressure responsive diaphragm 68 against which abuts plunger 64. Casing 66 is formed with an opening and a fitting 70 so as to secure one end of a conduit 72 to casing 66. Conduit 72 is connected to a source of vacuum 74, such as the intake manifold of the vehicle engine, so that vacuum may be applied against diaphragm 68. Acting on diaphragm 68 against the force of the vacuum is a spring 76.

Spring 76, acting through diaphragm 68, causes throttle valve 12 to open. Vacuum from source 74 entering casing 66 through conduit 72 and fitting 70 acts upon diaphragm 68 counteracting the force of spring 76 and permitting throttle valve 12 to close.

As a control for servo mechanism 18, an opening or vent 77 in conduit 72 has been provided whereby atmosphere may be admitted to conduit 72, as shown in FIGURE 3. When the power steering system 24 is neutralized or inoperative, as in FIGURE 1, the opening in conduit 72 is closed by a stopper 78 supported in one end of a clamp 80. Clamp 80 surrounds conduit 50 and is secured at its other end, as at 82, to conduit 72. Clamp 80 is biased or formed of a resilient material such that it will maintain stopper 78 in position to close vent 77. When vent 77 is closed, vacuum from source 74 will act on diaphragm 68 permitting throttle valve 12 to close. However, when the power steering system 24 is in operation, the pressure of the fluid in conduit 50 will increase, thereby causing conduit 50 to expand. The amount of expansion can be noted in FIGURE 3 where conduit 50 is illustrated in an expanded condition and the original size is indicated by a line 84. The expansion of conduit 50 forces clamp 80 to expand and displace stopper 78 from vent 77. Atmosphere is admitted to conduit 72 nullifying the effect of vacuum from source 74 and permitting spring 68 to cause throttle valve 12 to open.

It will be appreciated that this invention is also adaptable to other vehicle accessory systems, such as an air conditioning system, which utilize a fluid under pressure.

I claim:

1. For use is an engine driven vehicle having a throttle valve and an engine driven pressure developing mechanism including a conduit radially expansible as pressure is developed in said mechanism, a device positioned about said conduit and adapted to respond to radial expansion thereof to open said throttle valve.

2. For use in an engine driven vehicle having a throttle valve and an engine driven accessory system including first means expansibly responsive to operation of said system, means adapted to open said throttle valve in response to expansion of said first means comprising pressure responsive means operatively connected to said throttle valve, biasing means causing said pressure responsive means to open said throttle valve, means to apply vacuum from a source of vacuum against said pressure responsive means and thereby overcome said biasing means, venting means through which to apply fluid from a source of fluid against said pressure responsive means and thereby destroy the vacuum, and means responsive to the expansion of said first means adapted to open said venting means to the fluid.

3. For use in an engine driven vehicle having a throttle valve and an engine driven accessory system including first means expansibly responsive to operation of said system, means adapted to open said throttle valve in response to expansion of said first means comprising diaphragm means operatively connected to said throttle valve, biasing means causing said diaphragm means to open said throttle valve, means to apply vacuum from a source of vacuum against said diaphragm means and thereby overcome said biasing means, venting means to apply fluid from a source of fluid against said pressure responsive means and thereby destroy the vacuum, and means responsive to the expansion of said first means adapted to open said venting means to the fluid.

4. For use in an engine driven vehicle having a throttle valve, an intake manifold, and an engine driven power steering system including a conduit radially expansible in response to operation of said system, means adapted to respond to radial expansion of said conduit to open said throttle valve comprising flexible diaphragm means operatively connected to said throttle valve, spring biasing means causing said diaphragm means to open said throttle valve, means to apply vacuum from said intake manifold against said diaphragm means and thereby overcome said biasing means, venting means in said connecting means to admit atmosphere to said connecting means and thereby destroy the vacuum applied against said diaphragm means, a stopper, and a clamp secured at one end to said venting means, supporting said stopper at the other end, and biased to cause said stopper to close said venting means, said clamp surrounding said conduit and expansible therewith to displace said stopper and open said venting means to the atmosphere.

References Cited by the Examiner
UNITED STATES PATENTS

| | | | |
|---|---|---|---|
| 2,869,325 | 1/59 | Samuely | 60—19 X |
| 2,931,305 | 4/60 | Stratton | 60—19 X |

JULIUS E. WEST, *Primary Examiner.*
EDGAR W. GEOGHEGAN, *Examiner.*